United States Patent
Dodgen et al.

[15] 3,659,894
[45] May 2, 1972

[54] VEHICLE MOUNTED CAMPER COACH

[72] Inventors: John N. Dodgen, Humboldt; Harry L. Taylor, Dakota City, both of Iowa

[73] Assignee: Dodgen Industries, Inc., Humboldt, Iowa

[22] Filed: May 4, 1970

[21] Appl. No.: 34,491

[52] U.S. Cl. ...................................296/23 MC, 296/37
[51] Int. Cl. ...........................................................B60p 3/32
[58] Field of Search..........................296/23, 23 MC, 37, 24

[56] References Cited

UNITED STATES PATENTS

| | | | |
|---|---|---|---|
| 1,658,110 | 2/1928 | Warren | 296/24 |
| 3,248,083 | 4/1966 | De Gennaro | 296/23 |
| 1,554,413 | 10/1952 | Coppage | 296/37 |

Primary Examiner—Philip Goodman
Attorney—Zarley, McKee & Thomte

[57] ABSTRACT

A trailer coach mounted on a pickup truck, the floor of the coach supported on the bed of the truck and the coach having an elevated floor over a compartment assessible through outwardly pivotable doors concealed in their closed position by a carpet covering. One of the doors supports the posts of a table which is foldable unto itself when not used or extended by being pivoted to an open position, the outer half being supported on a pair of pivotal arms carried on the half secured to the posts. The table may be disassembled and stored in the compartment and oppositely disposed ledges over the walls of the truck bed may be extended over the elevated floor and provide double sleeping area while leaving space to pass therebetween. The water lines for the appliances in the camper may extend through the compartment which functions as an insulating chamber protecting the water lines from the freezing outside temperatures.

11 Claims, 7 Drawing Figures

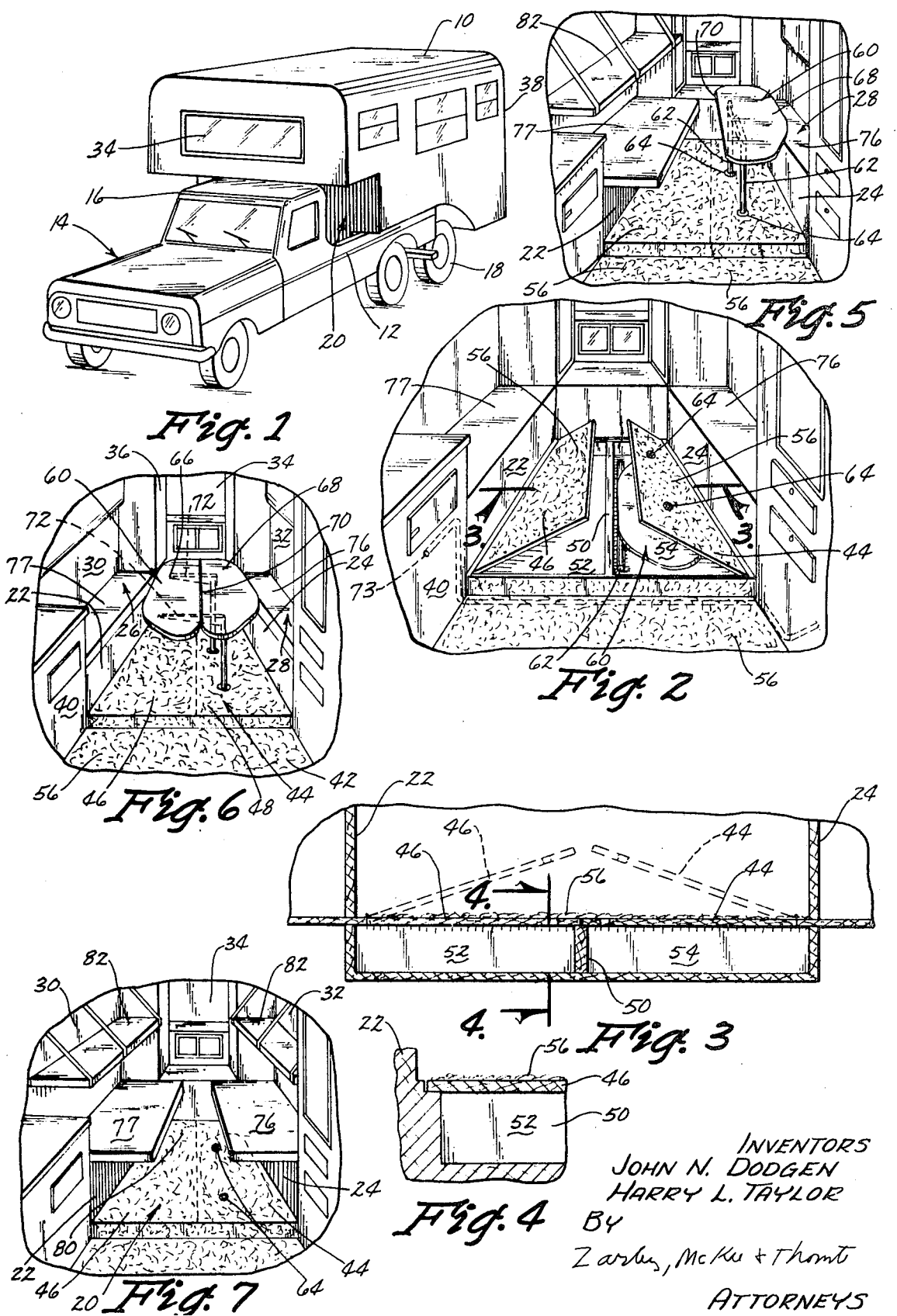

VEHICLE MOUNTED CAMPER COACH

The pickup truck mounted campers particularly are limited in the amount of space available for normal living. There is frequently insufficient room for dining, sleeping and storage of supplies and equipment such as skis, hunting equipment and fishing gear. If a dining table is employed it utilizes space that cannot be used for sleeping purposes. The skiing, hunting and fishing equipment unless otherwise accommodated will only clutter up the camper.

The camper coach of this invention provides a maximum storage area, dining accommodations plus sleeping space. This is accomplished by providing an elevated floor including outwardly pivotal doors covered by a shag rug which camouflages the doors. A compartment under the doors provides storage space for skis, guns and a table which is mounted on one of the doors and is cantilevered over the other door. People may sit on opposite sides of the table on ledges extending over the sides of the pickup bed. The table may be disassembled and placed in the compartment under the elevated floor and the ledges may be extended towards each other leaving space therebetween to walk through thus providing a maximum amount of sleeping area. Bunk-type beds may be pivoted down from above over the ledges and additionally sleeping space is available forwardly in the camper over the driver's compartment of the truck.

Additionally, campers used in the fall and winter months are subjected to freezing problems when water operated appliances are utilized. The camper coach of this invention provides insulating chamber for the water line as it extends through the compartment between the raised floor and the camper floor.

This invention consists in the construction, arrangements and combination of the various parts of the device, whereby the objects contemplates are attained as hereinafter more fully set forth, specifically pointed out in the claims, and illustrated in the accompanying drawings in which:

FIG. 1 is a perspective view of the camper coach of this invention mounted on a pickup truck.

FIG. 2 is a fragmentary perspective view of the camper showing the doors covering the compartment in the elevated floor partially open.

FIG. 3 is a cross-sectional view taken along line 3 — 3 in FIG. 2.

FIG. 4 is a cross-sectional view taken along line 4 — 4 in FIG. 3.

FIG. 5 is a perspective view similar to FIG. 2 but showing the doors in their closed position and one ledge opened up for sleeping purposes and a table in its folded position installed on one of the doors.

FIG. 6 is a fragmentary perspective view showing the dining table fully opened for use by people sitting on the ledges on opposite sides; and FIG. 7 is a fragmentary perspective view showing the dining table disassembled and stored in the storage compartment in the raised floor and the ledges fully extended and the upper bunk beds pivoted down to provide maximum sleeping accommodations.

The camper of this invention is referred to generally by the reference numeral 10 in FIG. 1 and is shown mounted on the bed 12 of a pickup truck 14 having a cab 16. The pickup truck 14 includes supplemental detachable ground engaging wheels 18 to stabilize the truck during road use and give additional support to the camper coach 10.

The camper coach 10 includes a longitudinal section 20 extending between the side walls of the pickup bed 12. This section 20 of the coach has side walls 22 and 24. A pair of ledges 26 and 28 extend outwardly over the truck bed side walls and connect to outer upstanding coach walls 30 and 32 a forward compartment 34 is provided in the coach and is in communication with the coach section 20 through a passageway 36. A rear coach section 38 includes the kitchen appliances 40 including stove, sink and refrigerator.

The rear section 38 of the coach includes a floor 42 which extends into the coach section 20 which has an elevated floor 44 including outwardly pivotal doors 46 and 48 which meet along the longitudinal center of the coach and are supported at their inner edges by a member 50 which divides the space under the doors into two compartments 52 and 54. The doors 44 and 46 are covered with shag rug carpeting 56 similar to the carpeting 56 on the floor of the rear coach compartment 38 and thus conceals the dividing line between the doors when in their closed condition as seen in FIG. 6.

In FIGS. 5 and 6 a breakfast table 60 is shown supported on a pair of legs 62 removably received in base support plates 64 secured to the door 56. The table top is split down the center and includes identical half sections 66 and 68 connected together by a piano-type hinge 70. A pair of pivotal arms 72 are connected to the table section 68 to be pivoted out under the other section 66 when the table is in its open position as seen in FIG. 6 and may be pivoted back under the section 68 when the table is folded to its closed position of FIG. 5. The table legs 62 being removably attached to the table section 68 may be disassembled therefrom and stored along with the table 60 in the storage compartment 54 under the door 44.

The compartments 52 and 54 not only provide storage but additionally function as an insulation chamber to prevent water pipes or the like such as the pipe 73 in FIG. 2 from freezing when the coach is being used in winter conditions, such as on skiing trips or the like. Otherwise, the water pipes would have to be run outside of the coach and would be directly affected by the outside temperature. In this invention the water pipes may be maintained inside the coach where the temperature is room temperature but yet are out of sight since they extend only through the elevated floor 20 and into the appliances requiring water or the like.

The ledges 26 and 28 include cushions or mattresses 76 and 77 which may extend out over the elevated floor 20 as seen in FIG. 7 to provide a passageway 80 therebetween but double the sleeping space afforded when they are in their retracted position of FIGS. 2 or 6, for example. Additionally, sleeping bunks 82 may be folded down from the walls 30 and 32 to provide additional sleeping space which further supplements the so-called master bedroom in the forward coach compartments 34. It is seen, if desired, that additional people could sleep on the elevated floor 20 under the extended ledge cushions 76 and 77 as seen in FIG. 7.

It is thus seen in use that maximum use of the camper coach 10 may be afforded through the use of applicants' design in this invention. Any number of combinations of features may be used together or alone such as sleeping accommodations are provided on the top and bottom cushions of the bunk 82 and the ledge cushion 77 on the left-hand side of the coach in FIG. 5 while the right-hand side of the coach is used as a dining facility with people sitting on the ledge 28 at the table 60 in its folded condition. By the table being opened to the position of FIG. 6, people sitting on the ledge 26 may additionally be accommodated at the table 60. When the table is in its folded closed position of FIG. 5, passage thereby between it and the extended ledge bed 76 is afforded. When sleeping only is desired, the table 60 is removed from the posts and placed inside the compartment 54 as seen in FIG. 2 or the compartment 52 leaving only the base support plates 64 exposed. These are hardly noticeable in the shag rug 56. Considerable additional storage space is provided in the elevated floor 44 by covering the entire floor of the coach section 20 extending between the forward coach section 34 and the rear section 38.

We claim:

1. A camping coach having a bottom floor supported on the bed of a truck and oppositely disposed ledges extending over the truck bed side walls, and an elevated floor on said coach floor extending substantially the length of said truck bed and providing a compartment between said elevated floor and said coach floor, said elevated floor including a pair of hinged doors providing access into said compartment.

2. The structure of claim 1 wherein one of said doors only includes a post support means, a table post means detachably engaging, at one end and post support means, and a table top detachably secured to the opposite end of said table post means.

3. The structure of claim 2 wherein said table top includes pivotally interconnected half sections adapted to pivot from a first position folded with one half section on top of the other half section and to a second position open and horizontally disposed, said table post means engaging only said one table top half section.

4. The structure of claim 3 wherein said pair of doors pivot along their outer longitudinal edges and meet along their inner longitudinal edges in a closed condition.

5. The structure of claim 4 wherein said compartment is divided into two compartments by a door support ledge extending along the longitudinal center of said compartment on said camper floor and said doors engaging said ledge along their adjacent longitudinal inner edges when in a closed condition.

6. The structure of claim 5 wherein said table post means includes two post members longitudinally spaced apart and said post support means includes two post support elements for engaging said two post members.

7. The structure of claim 5 wherein said two compartments include one compartment having a width sufficiently large enough to receive said table top in its folded condition and allow said doors to be closed thereupon.

8. The structure of claim 7 wherein said ledges include expandable beds adapted to extend towards the center of said camper over said pair of doors and provide a walk passageway therebetween when said table top has been removed.

9. The structure of claim 1 wherein said compartment includes a freezable conduit extending therethrough connecting a water source to water operated appliances in said camper whereby said conduit is insulated from freezing temperatures outside said camper.

10. The structure of claim 1 wherein said camper floor includes a rear floor portion extending rearwardly of said elevated floor thereby providing a step between said rear floor portion and said elevated floor inside said camper.

11. The structure of claim 1 and a carpet covering is provided on each of said doors to conceal the presence of said doors when in their closed condition.

* * * * *